(12) United States Patent
Alfano

(10) Patent No.: US 7,478,057 B2
(45) Date of Patent: Jan. 13, 2009

(54) METHOD FOR CONDUCTING AN ELECTRONIC COMMERCIAL TRANSACTION

(75) Inventor: Nicholas P. Alfano, Vancouver (CA)

(73) Assignee: Research In Motion Limited, Waterloo (CA)

( * ) Notice: Subject to any disclaimer, the term of this patent is extended or adjusted under 35 U.S.C. 154(b) by 409 days.

(21) Appl. No.: 10/359,958

(22) Filed: Feb. 6, 2003

(65) Prior Publication Data

US 2004/0107146 A1   Jun. 3, 2004

Related U.S. Application Data

(60) Provisional application No. 60/430,370, filed on Dec. 3, 2002.

(30) Foreign Application Priority Data

Nov. 29, 2002  (CA)  ..................................... 2413340

(51) Int. Cl.
   *G06Q 30/00*  (2006.01)
(52) U.S. Cl. ................. 705/26; 705/1; 705/35
(58) Field of Classification Search ................. 455/406; 705/26, 27
   See application file for complete search history.

(56) References Cited

U.S. PATENT DOCUMENTS

| | | | | |
|---|---|---|---|---|
| 5,991,749 | A * | 11/1999 | Morrill, Jr. ..................... | 705/44 |
| 6,169,890 | B1 * | 1/2001 | Vatanen ....................... | 455/406 |
| 7,039,389 | B2 * | 5/2006 | Johnson, Jr. ................. | 455/406 |
| 2001/0037264 | A1 * | 11/2001 | Husemann et al. ............ | 705/26 |
| 2002/0035605 | A1 | 3/2002 | McDowell et al. | |
| 2002/0058494 | A1 * | 5/2002 | Timonen et al. ............ | 455/405 |
| 2002/0062385 | A1 * | 5/2002 | Dowling ..................... | 709/230 |
| 2002/0065774 | A1 * | 5/2002 | Young et al. .................. | 705/41 |
| 2002/0147658 | A1 * | 10/2002 | Kwan .......................... | 705/26 |
| 2003/0055735 | A1 * | 3/2003 | Cameron et al. .............. | 705/26 |
| 2004/0006489 | A1 * | 1/2004 | Bynon .......................... | 705/2 |
| 2005/0187873 | A1 * | 8/2005 | Labrou et al. ................. | 705/40 |
| 2006/0000900 | A1 * | 1/2006 | Fernandes et al. ........... | 235/380 |
| 2006/0020540 | A1 * | 1/2006 | Cramer ........................ | 705/39 |

OTHER PUBLICATIONS

First data and entrust technologies form new integrated secure payment company for B2B e-Markets. May 23, 2000. PR Newswire. New York.*

* cited by examiner

Primary Examiner—Jeffrey A. Smith
Assistant Examiner—Jason B. Dunham
(74) Attorney, Agent, or Firm—Jones Day; Krishna K. Pathiyal; Robert C. Liang

(57) ABSTRACT

A method for conducting an e-commerce transaction between a user and a merchant is disclosed. The user has a customer account with a communication provider operating a first communication network. The customer account includes personal information about the user. The method includes the steps of: a) establishing communication between the user and the communication provider over the first communication network; b) authenticating the user to the communication provider; c) selecting a product from the merchant for the e-commerce transaction; d) retrieving the personal information about the user from the customer account; and e) completing the e-commerce transaction.

7 Claims, 3 Drawing Sheets

METHOD FOR CONDUCTING AN ELECTRONIC COMMERCIAL TRANSACTION

CROSS-REFERENCE TO RELATED APPLICATIONS

This application claims priority from Canadian Patent Application No. 2,413,340, filed on Nov. 29, 2002, and also claims the benefit of U.S. Provisional Application No. 60/430,370, filed on Dec. 3, 2002.

FIELD OF THE INVENTION

The invention relates to electronic commerce, and in particular, to a system and method for conducting and electronic commerce transaction.

BACKGROUND OF THE INVENTION

The Internet has created tremendous growth in electronic commerce (i.e. the purchase of goods and services on-line). Electronic commerce is also referred to as "e-commerce". To complete an e-commerce transaction, the user is typically required to provide information to the merchant web site, which typically includes the user's name, address, and financial information (usually credit card information). This information may be entered manually by the user. Alternatively, there are a number of well known ways in which the input of information may be automated, such as form filling tools, and digital wallets. However, these alternatives still require the user to submit certain information to the merchant web site, increasing the time required to complete the e-commerce transaction and inconvenience to user.

In order to avoid fraudulent transactions, the merchant web site may also wish to authenticate the user. A number of authentication methods, such as user names and passwords, digital certificates, hardware tokens, or the like are well known. Depending on the authentication method used, the user may be required to enter additional information, such as a user name and password, further inconveniencing the user.

Recently, more users are accessing the Internet using mobile devices (such as digital phones, pagers and personal digital assistants (PDAs)). These mobile devices generally have a smaller screen and constrained input capabilities than the personal computers currently in widespread use. Consequently, entering or providing information required by merchant web sites is an even greater inconvenience for users of mobile devices.

Accordingly there is a need for a method of conducting an e-commerce transaction which reduces the amount of information required to be provided by a user of a mobile device and facilitates authentication of the user to the merchant.

SUMMARY OF THE INVENTION

According to a first aspect of the invention, a method for conducting an e-commerce transaction between a user and a merchant is provided. The user has a customer account with a communication provider operating a first communication network. The customer account includes personal information about the user therein. The method comprises: a) establishing communication between the user and the communication provider over the first communication network; b) authenticating the user to the communication provider; c) selecting a product from the merchant for the e-commerce transaction; d) retrieving the personal information about the user from the customer account; and e) completing the e-commerce transaction.

According to a second aspect of the invention, a system for conducting an e-commerce transaction is provided. The system comprises:

a mobile device adapted for operation by a user;

a wireless network adapted for communication with the mobile device, the wireless network being operated by a communication provider, the user having a customer account with the communication provider, the customer account comprising personal information about the user;

a credential verification server adapted for access to the personal information; and a merchant server adapted for communication with the credential verification server via the Internet;

wherein, upon request from the merchant server, the credential verification server is adapted to provide the personal information from the customer account to the merchant server to complete the e-commerce transaction.

According to a third aspect of the invention, a computer readable medium including a computer program that conducts an e-commerce transaction between a user and a merchant is provided. The user has a customer account with a communication provider operating a first communication network. The customer account includes personal information about the user therein. The computer program causes the computer to perform the steps of: a) establishing communication between the user and the communication provider over the first communication network; b) authenticating the user to the communication provider; c) selecting a product from the merchant for the e-commerce transaction; d) retrieving the personal information about the user from the customer account; and e) completing the e-commerce transaction.

BRIEF DESCRIPTION OF THE DRAWINGS

The present invention will now be described, by way of example only, with reference to the following figures, in which.

DETAILED DESCRIPTION OF THE INVENTION

As used in herein, a "product" includes any goods or services, and a "transaction" is any transfer of a product, including without limitation sales, leases, auctions or the like.

Figure 1:
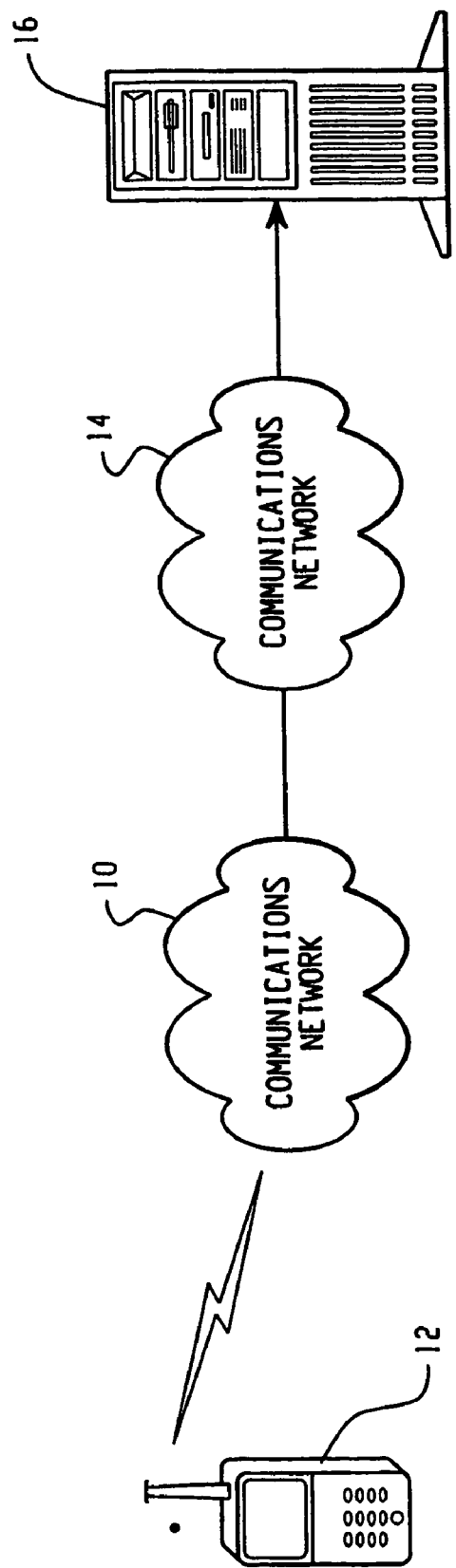
FIG. 1 is a block diagram illustrating an e-commerce system in accordance with an embodiment of the present invention.

FIG. 1 shows a first communication network 10, which is in communication with a mobile device 12. Although for clarity, only one mobile device is shown in FIG. 1, it will be understood that any number of mobile devices may be simultaneously connected to the first communication network 10. The mobile device 12 may be any device such as mobile phone, PDA, or the like which is capable of sending and receiving communications via the first communication network 10.

Continuing to refer to FIG. 1, the first communication network 10 is preferably in communication with a second communication network 14. The second communication network 14 is in communication with a merchant server 16 operated by a merchant offering goods and/or services. The merchant server 16 may be an application server, a web server or any other type of server capable of offering e-commerce services over the second communication network 14. However, it will be understood by those skilled in the art that the merchant server 16 may be part of the first communication network 10, and may be operated by the communication provider. In this case, the method of conducting an e-commerce transaction according to the present invention may be carried out on the first communication network 10, and use of the second communication network 14 is not required.

Figure 2:
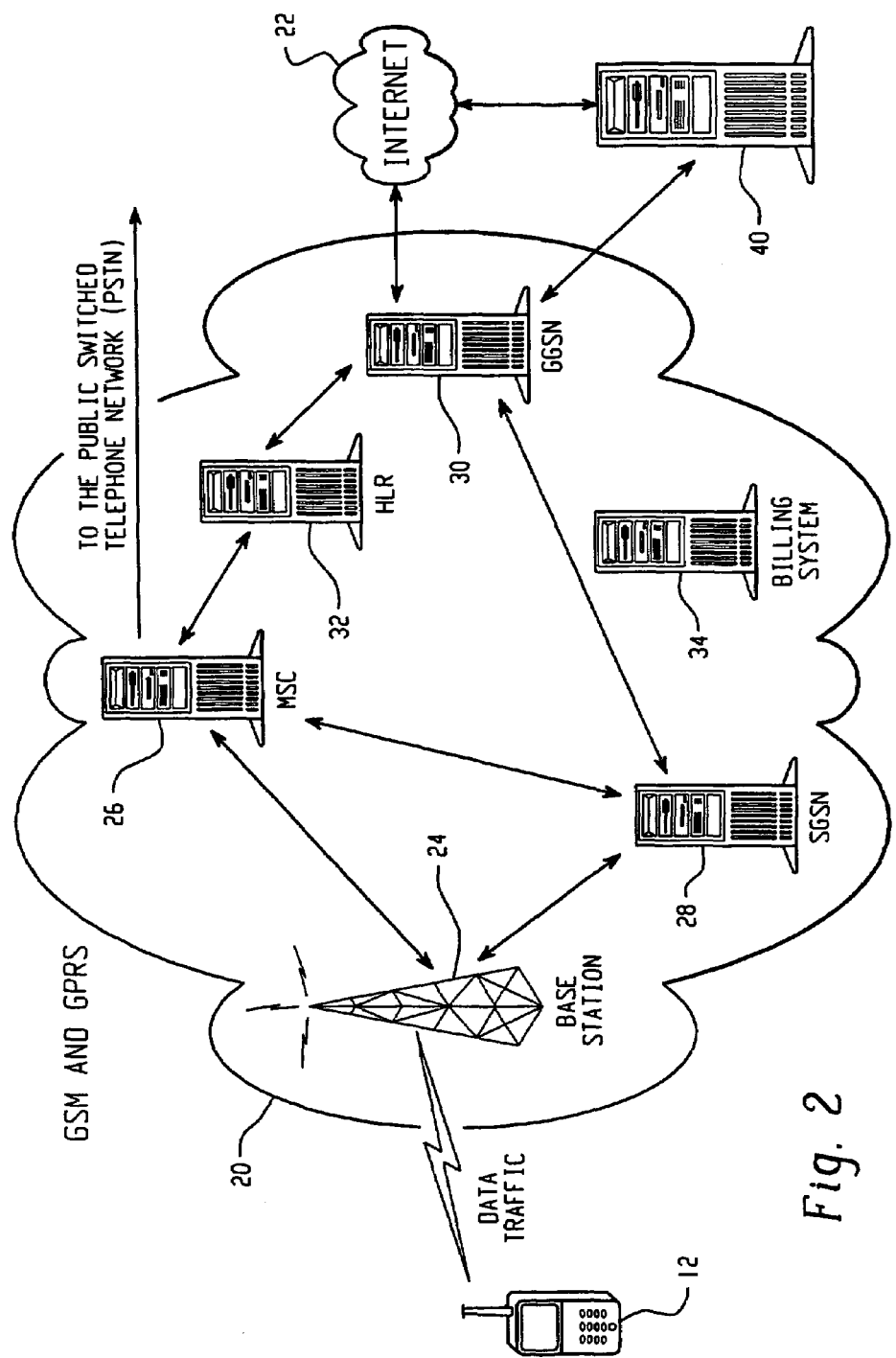
FIG. 2 is a block diagram providing additional detail on the system shown in FIG. 1.

FIG. 2 shows a preferred embodiment of the system shown in FIG. 1. As shown in FIG. 2, the first communication network is preferably a wireless network 20 and the second communication network is preferably the Internet 22. The wireless network 20 is operated by a communication provider, such as a commercial wireless service operator. The mobile device 12 is operated by a user who is a customer of the communication provider. The user has a customer account with the communication provider. The account includes personal information about the user, which is stored on a database or the like. The personal information may include the user's name, address, financial instrument information, and any other information about the user required to authenticate the user or provide goods and services to the user.

Continuing to refer to FIG. 2, the wireless network 20 may be a GSM (Global System for Mobile communications) network which supports the GPRS (General Packet Radio Service) for transmission of data. It will be understood by those skilled the art that the wireless network may be any other type of network, such as CDMA, Mobitex, DataTac, PDC, CMDA2000, UMTS, or the like.

Referring to FIG. 2, the wireless network 20 preferably comprises a cellular radio network, which comprises any suitable number of base stations 24, mobile switching centers 26, and network management equipment and other equipment used to support connectivity to other fixed or mobile communicating devices or to offer specific services (not shown). The wireless network 20 may also include a home location register (HLR) 32 and a billing system 34. The HLR 32 is a database containing personal information and other information about users who are customers of the communication provider. The billing system 34 generates the user's bill. The components of the wireless network 20 describe above are well known in the art and will not be described further.

Referring to FIG. 2, the mobile device 12 is preferably a wireless device, with its own power source supporting a radio transmitter and receiver. The mobile device 12 and base stations 24 communicate over predefined radio frequencies obeying a set of protocols used to establish a connection and transfer information via that connection. Within the set of protocols executed between the mobile device 12 and base stations 24, there exists at least two generic types of information that can be categorized as control (or signaling) information and traffic information. Control information is typically, but not exclusively, transmitted from the base stations 24 to the mobile device 12. The mobile device 12 upon receiving and correctly interpreting the control information may derive the method for obtaining the traffic information. This method, for example, may be the radio frequency and coding scheme used to transfer the traffic information. The traffic information may be human audible voice, data, images or any combination of multi-media transmissions that could be usable for conveying information to a human or machine.

Continuing to refer to FIG. 2, GPRS support in the wireless network 20 is provided by the Serving GPRS Support Node (SGSN) 28 and the Gateway GPRS Support Node (GGSN) 30, which permit communication of data traffic via the Internet 22 to an external device, such the merchant server 16 (shown in FIG. 1). The SGSN 28 tracks the location of the mobile device 12, performs user authentication for wireless network access using information in the HLR 32, and ensures security of information transmitted over radio frequencies by encrypting/decrypting the transmitted information. The GGSN 30 provides interoperability with external packet switched networks such as the Internet 22.

Figure 3:
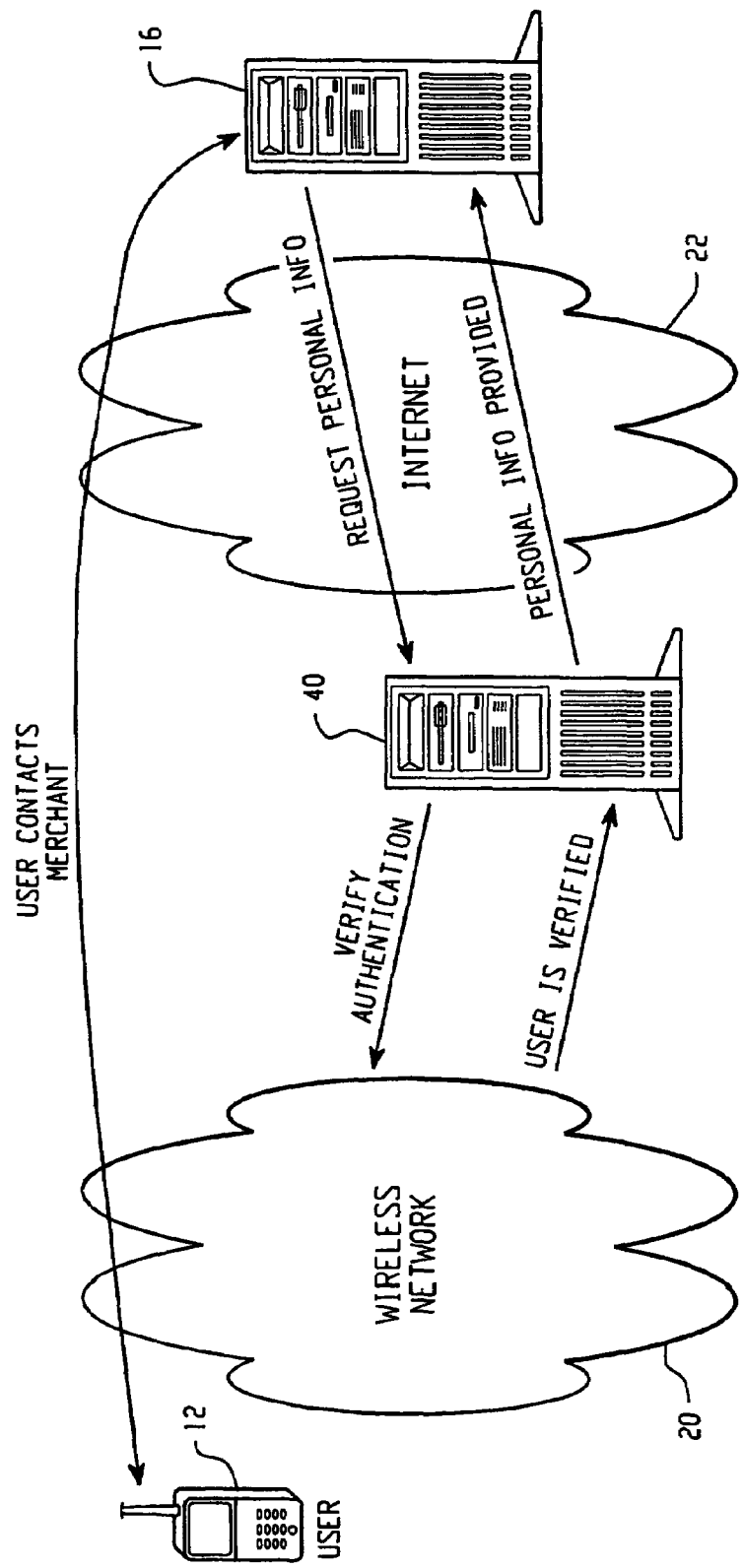
FIG. 3 is a block diagram illustrating a number of steps in a preferred embodiment of the method according to the present invention.

Referring now to FIGS. 2 and 3, a credential verification server 40 is provided to receive requests relating to personal information of the user, as described in more detail below. According to the embodiment shown in FIGS. 2 and 3, the credential verification server 40 is operated by a third party and is in communication with the wireless network 20 and the Internet 22. Preferably, the credential verification server 40 is implemented on a standalone computer. However, it will be understood by those skilled in the art that the credential verification server 40 may be implemented as several software programs running on different computers, or as one or more software programs running on a single computer.

In an alternative embodiment, the credential verification server 40 may be owned by the communication provider and be part of the wireless network 20. In such an embodiment, the credential verification server 40 is preferably a standalone server, but may also be implemented as software running on one or more of the other components of the wireless network 20.

The method according to a preferred embodiment of the present invention will now be described with reference to FIGS. 1-3. When the user's mobile device 12 is on, and the mobile device 12 and base station 24 are able to transmit radio signals therebetween, the wireless network 20 authenticates the user as a customer of the communication provider. To authenticate the user to the communication provider on a GSM network, the mobile device 12 transmits a unique identifier called an International Mobile Subscriber Identity (IMSI). The IMSI is matched to the user's customer profile stored in the SGSN 28 and/or the HLR 32. If the IMSI from the mobile device 12 is matched to a corresponding IMSI in a valid user account, the mobile device 12 is permitted to connect to the wireless network 20.

The user sends a request for the e-commerce transaction to the merchant server 16 using the mobile device 12. The user may enter the merchant's web site URL (Universal Resource Locator), select the merchant's URL from a menu on the mobile device 12, enter the Internet Protocol (IP) address of the merchant server 16, or in some other well known manner. The mobile device 12 sends the request to the wireless network 20 using a wireless protocol, such as GPRS over GSM. The communication is routed to the Internet 22 via the SSGN 28 and GGSN 30, which may translate the request to HTTP (hypertext transfer protocol).

In addition to information required to select a product from the merchant server 16, the request sent from the mobile device 12 includes identification information, such as the user's telephone number and the identity of the communication provider which operates the wireless network 20 of which the user is a customer. This additional information is provided using an application level protocol, such as an XML (Extensible Markup Language) based protocol. When the merchant server 16, detects the identification information in the request, the merchant server 16 launches an application which recognizes that the personal information about the user may be obtained from the credential verification server 40.

The user may browse the merchant's web site and select the desired item. When the merchant server 16 requires any personal information from the user, such as name, address, financial instrument information, credit history, the merchant server 16 preferably requests this information from the credential verification server 40 using the application described above. The credential verification server 40 obtains the personal information required from the user's customer account and returns the information to the merchant server 16. If the merchant server 16 requires authentication of the user, the merchant server 16 sends a request to the credential verification server 40. The credential verification server 40 verifies that the user has been authenticated by the wireless network 20 by for, example, retrieving authentication confirmation from the HLR 32. This authentication confirmation is included in the user personal information.

The credential verification server 40 may cache the personal information, or alternatively, it may retrieve the information from the HLR 32, billing system 34, or other communication provider equipment.

After receiving all required personal information from the credential verification server 40, the merchant server 16 then completes the e-commerce transaction. For payment, the merchant server 16 may debit the financial instrument received from the credential verification server 40, as part of the user's personal information.

Alternatively, the merchant server may, after the transaction is complete, submit a purchase record to the communication provider, who will then add the amount owed to the merchant to the user's account and bill the user together with amounts owing for use of the communications' provider wireless services. This embodiment provides the merchant with cost savings by avoiding transaction fees charged by financial institutions, such as credit card fees, and by not having to generate its own invoices for purchases on its web site. Although the communication provider may charge a fee for its services, the fee may be less than that of a credit card transaction, as the communication provider is exploiting information and functionality it has already implemented in its network infrastructure for its business. The communication provider may set a ceiling on the amount a user can purchase during a billing period, similar to a credit limit.

The method according to the present invention reduces or eliminates the need for users of mobile devices to enter personal information. In addition, merchants and communication providers can use the personal information to ensure the users approved for transactions have a good payment history and their customer accounts are in good standing, thus minimizing the risk of the merchant not receiving payment.

In an alternative embodiment of the invention, the merchant server 16 may require that the user enter the personal information. The merchant server 16 may then request the same personal information from the credential verification server 40 to confirm the information it has received from the user. Alternatively, the merchant server 16 may request that the user provide some personal information, such as authentication information (e.g. user name and password), but may request some other personal information, such as the user's address from the credential verification server 40 to eliminate the need for the user to enter or otherwise submit this information.

In another alternative embodiment of the invention, a consolidation server (not shown) may be provided. The consolidation server communicates with a plurality of credential verification servers 40, each of which is operated by one of a plurality of communication providers of different wireless networks 20. When obtaining a user's personal information, the merchant server 16 communicates with the consolidation server, regardless of the wireless network 20 of which the user is a customer. The consolidation server would then contact the credential verification server 40 for the appropriate communication provider to obtain the user's personal information. As above, the merchant may debit a user's financial instrument directly or may debit the user's customer account with the communication provider. In this case, the merchant server 16 send the payment to the consolidation server, which would redirect it to the appropriate communication provider so that the user's customer account is debited for the payment.

While the present invention as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims.

The invention clamed is:

1. A method for use by a merchant in an e-commerce transaction, comprising:

a) receiving via a network connection a request for an e-commerce transaction from a wireless mobile device operated by a customer over a wireless network, wherein the wireless network is operated by a communication provider and provides the network connection to the merchant, the customer having a customer account with the communication provider, the customer account including personal information pertaining to the customer, the request including information pertaining to at least one of the merchant's products or services;

b) detecting customer identification information in the request for the e-commerce transaction, the customer identification information being provided using an application level protocol and automatically by the mobile device without the customer inputting the customer identification information, the customer identification information not including financial instrument related information;

c) in response detecting the customer identification information, launching an application that recognizes that required personal information relating to the customer may be obtained from a credential verification server, the credential verification server comprising a first credential verification server and a second credential verification server, the first credential verification server being operated by a first communication provider and the second credential verification server being operated by a second communication provider which is different from the first communication provider;

d) contacting a consolidation server, wherein the consolidation server selects an appropriate credential verification server from which to obtain the required personal information, and requesting from the appropriate credential verification server the required personal information, wherein the appropriate credential verification server obtains the required personal information from the customer account with the communication provider, wherein the customer is not contacted via a different network connection or another device to provide the personal information or to the approve the transaction;

e) receiving the required personal information from the appropriate credential verification server;

f) debiting a financial instrument received from the appropriate credential verification server as part of the required personal information; and g) causing the merchant's product to be delivered to the customer.

2. The method of claim 1, wherein the credential verification server is a part of the wireless network.

3. The method of claim 1, wherein the credential verification server caches the personal information of the customer thereon.

4. The method of claim 1 wherein the required personal information further comprises wireless network authentication information.

5. The method of claim 1, wherein the required personal information further comprises the user's name, address, and financial instrument information.

6. The method of claim 1, wherein the required personal information further comprises the user's credit history.

7. The method of claim 1, wherein the application level protocol is an XML (Extensible Markup Language) based protocol.

* * * * *

UNITED STATES PATENT AND TRADEMARK OFFICE
CERTIFICATE OF CORRECTION

PATENT NO. : 7,478,057 B2  Page 1 of 1
APPLICATION NO. : 10/359958
DATED : January 13, 2009
INVENTOR(S) : Alfano It is certified that error appears in the above-identified patent and that said Letters Patent is hereby corrected as shown below:

Column 6, line 53, please change "in response detecting" to -- in response to detecting --

Column 7, lines 6-7, please change "provide the personal information" to -- provide the required personal information --

Signed and Sealed this

Twenty-second Day of December, 2009

David J. Kappos
*Director of the United States Patent and Trademark Office*